United States Patent
Bellows

(10) Patent No.: US 9,792,474 B2
(45) Date of Patent: Oct. 17, 2017

(54) RADIO FREQUENCY IDENTIFICATION READER ANTENNA ARRANGEMENT WITH MULTIPLE LINEARLY-POLARIZED ELEMENTS

(71) Applicant: SYMBOL TECHNOLOGIES, LLC, Lincolnshire, IL (US)

(72) Inventor: David E. Bellows, Wantagh, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/257,966

(22) Filed: Sep. 7, 2016

(65) Prior Publication Data

US 2016/0379021 A1    Dec. 29, 2016

Related U.S. Application Data

(63) Continuation of application No. 13/411,670, filed on Mar. 5, 2012, now abandoned.

(51) Int. Cl.
| | | |
|---|---|---|
| H04Q 5/22 | (2006.01) |
| G06K 7/10 | (2006.01) |
| H01Q 1/00 | (2006.01) |
| H01Q 1/22 | (2006.01) |
| H01Q 3/24 | (2006.01) |
| H01Q 7/00 | (2006.01) |

(Continued)

(52) U.S. Cl.
CPC ......... *G06K 7/10356* (2013.01); *H01Q 1/007* (2013.01); *H01Q 1/2216* (2013.01); *H01Q 3/24* (2013.01); *H01Q 7/00* (2013.01); *H01Q 19/106* (2013.01); *H01Q 21/205* (2013.01); *H01Q 21/24* (2013.01)

(58) Field of Classification Search
CPC ...... H01Q 19/106; H01Q 3/24; H01Q 21/205; H01Q 21/24; H01Q 1/007; H01Q 1/2216; H01Q 7/00
USPC .......... 340/572.1–572.9, 5.1–5.5, 10.1–10.6; 235/375–385
See application file for complete search history.

(56) References Cited

U.S. PATENT DOCUMENTS

| | | |
|---|---|---|
| 7,873,341 B2 | 1/2011 | Jaffri et al. |
| 8,077,044 B2 | 12/2011 | Nikitin et al. |

(Continued)

FOREIGN PATENT DOCUMENTS

| | | |
|---|---|---|
| DE | 112013001282 T5 | 12/2014 |
| EP | 1703435 A2 | 9/2006 |

(Continued)

OTHER PUBLICATIONS

International Search Report and Written Opinion for International Patent Application No. PCT/US2013/026796 dated May 24, 2013.

*Primary Examiner* — Ojiako Nwugo

(57) ABSTRACT

An antenna method and apparatus for a Radio Frequency Identification (RFID) reader includes an RFID reader, a plurality of radio ports of the RFID reader, and a plurality of linearly polarized antenna elements coupled to the radio ports, wherein the RFID reader directs the radio ports to sequentially communicatively connect only one antenna element at a time to the RFID reader such that only one antenna element is operable to transmit/receive at any instant in time. The antenna elements are mounted in an alternating vertically polarized and horizontally polarized configuration.

12 Claims, 7 Drawing Sheets

(51) Int. Cl.
*H01Q 19/10* (2006.01)
*H01Q 21/20* (2006.01)
*H01Q 21/24* (2006.01)

(56) References Cited

U.S. PATENT DOCUMENTS

| | | | |
|---|---|---|---|
| 2004/0077338 A1* | 4/2004 | Hsu | H01Q 1/2258 |
| | | | 455/414.1 |
| 2007/0194929 A1 | 8/2007 | Wagner et al. | |
| 2007/0252698 A1* | 11/2007 | Turner | G06K 7/0008 |
| | | | 340/572.2 |
| 2008/0231420 A1 | 9/2008 | Koyama et al. | |
| 2009/0146900 A1 | 6/2009 | Schneider et al. | |
| 2010/0039235 A1* | 2/2010 | Nagai | G06K 7/10336 |
| | | | 340/10.1 |
| 2010/0134252 A1* | 6/2010 | Sandler | H01Q 3/02 |
| | | | 340/10.1 |
| 2010/0214177 A1 | 8/2010 | Parsche | |
| 2010/0321166 A1 | 12/2010 | Horst et al. | |
| 2011/0256893 A1 | 10/2011 | Athley et al. | |
| 2012/0086553 A1* | 4/2012 | Wilkinson | G06K 19/07749 |
| | | | 340/10.1 |
| 2013/0154803 A1 | 6/2013 | Koch | |
| 2013/0229262 A1 | 9/2013 | Bellows | |

FOREIGN PATENT DOCUMENTS

| | | |
|---|---|---|
| EP | 2178024 A1 | 4/2010 |
| GB | 2517090 A | 2/2015 |
| WO | 2013/133969 A1 | 9/2013 |

* cited by examiner

RADIO FREQUENCY IDENTIFICATION READER ANTENNA ARRANGEMENT WITH MULTIPLE LINEARLY-POLARIZED ELEMENTS

RELATED APPLICATIONS

This is a continuation application of U.S. patent application Ser. No. 13/411,670, filed Mar. 5, 2012.

FIELD OF THE DISCLOSURE

The present disclosure relates generally to wireless antennas and more particularly to a Radio Frequency Identification (RFID) antenna arrangement.

BACKGROUND

Radio Frequency Identification (RFID) is utilized in a variety of applications with RFID readers communicating with RFID tags for purposes of identification, location, tracking, and the like. In an exemplary RFID application, an RFID reader may be mounted overhead (e.g., ceiling mounted) relative to a plurality of RFID tags, such as in a retail environment, a factory environment, a warehouse environment, etc. The overhead configuration offers several advantages such as fewer physical obstructions, ease of access to wiring in a ceiling, tamper resistance, safety, and the like. However, conventional overhead antenna configurations have disadvantages.

For example, it is desirable for an overhead RFID reader to be able to passively read all the RFID tags in the environment. However, it should be recognized that the tags and their antennas may have all different orientations, depending on how they are placed or stored in the environment. Optimally, a tag that is placed horizontally is best read by an RFID reader with horizontal polarization, and a tag that is placed vertically is best read by an RFID reader with vertical polarization. Of course, such perfect alignment is rarely achieved.

One solution to this random tag orientation is to provide cross-polarization, which provides a vertically polarized antenna and a horizontally polarized antenna, with overlapping RF coverage between antennas, in an RFID reader, where the RFID reader can switch between the antennas. One example of such an antenna arrangement is a cross-dipole where two dipole antennas are arranged at 90 degrees to each other making a "+" shape and are both fed in the center. Cross-polarization can read tags that are at either orientation and also tags angled between vertical and horizontal orientations, but with reduced gain. However, since each cross-polarized reader uses two antennas, the number of antennas ports required is doubled and the physical size of the solution is larger. In addition, such cross-polarized readers are not omnidirectional and do not have a 360 degree beamwidth, requiring several RFID readers to be deployed to cover the entire environment. Another solution to the problem is to provide circular polarization that can read tags at any orientation. However, such circular polarized readers need to be larger in size in order to maintain the same gain as their linearly polarized equivalent (i.e. 6 dB linear=9 dB circular). In addition, circular polarized readers are not omnidirectional and do not have a 360 degree beamwidth, requiring several RFID readers to be deployed to cover the entire environment.

Regarding coverage area, RFID ceiling reader antennas can be oriented in one of three ways—parallel, normal, or angular to the ceiling. As examples, when a slot antenna, a patch antenna, or a loop antenna is mounted parallel to the ceiling or a dipole antenna, or a Yagi antenna is mounted normal to the ceiling, the peak gain is at bore sight, with the main lobe of the antenna radiation directed perpendicular to the ceiling; much of the RF energy is therefore directed straight down to the floor/ground. In the angular mounted configuration, the angle of mount is selected to direct the main radiation lobe of the radiation pattern to a target of interest. A problem in these above scenarios is that, as we move away from the main lobe of the radiation pattern, the gain of the antenna begins to drop. For RFID applications, this situation results in a requirement to install multiple RFID readers with antennas aimed at various angles to get a consistent and a high percentage of RFID read coverage. However, the use of multiple readers not only drives the installation cost up but also does not result in a high percentage of tag reads in areas where the antenna gain falls from its peak. It is therefore very important to simplify and minimize the size, weight, and cost of the reader without compromising RF performance.

Accordingly, there is a need for an RFID antenna apparatus and method that overcome the aforementioned limitations. It would be beneficial to provide this overhead system in a small and lightweight arrangement while minimizing the number of RFID reader systems (especially ceiling mounted) installed in a particular environment, and maintaining/increasing overall read accuracy and read percentages.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
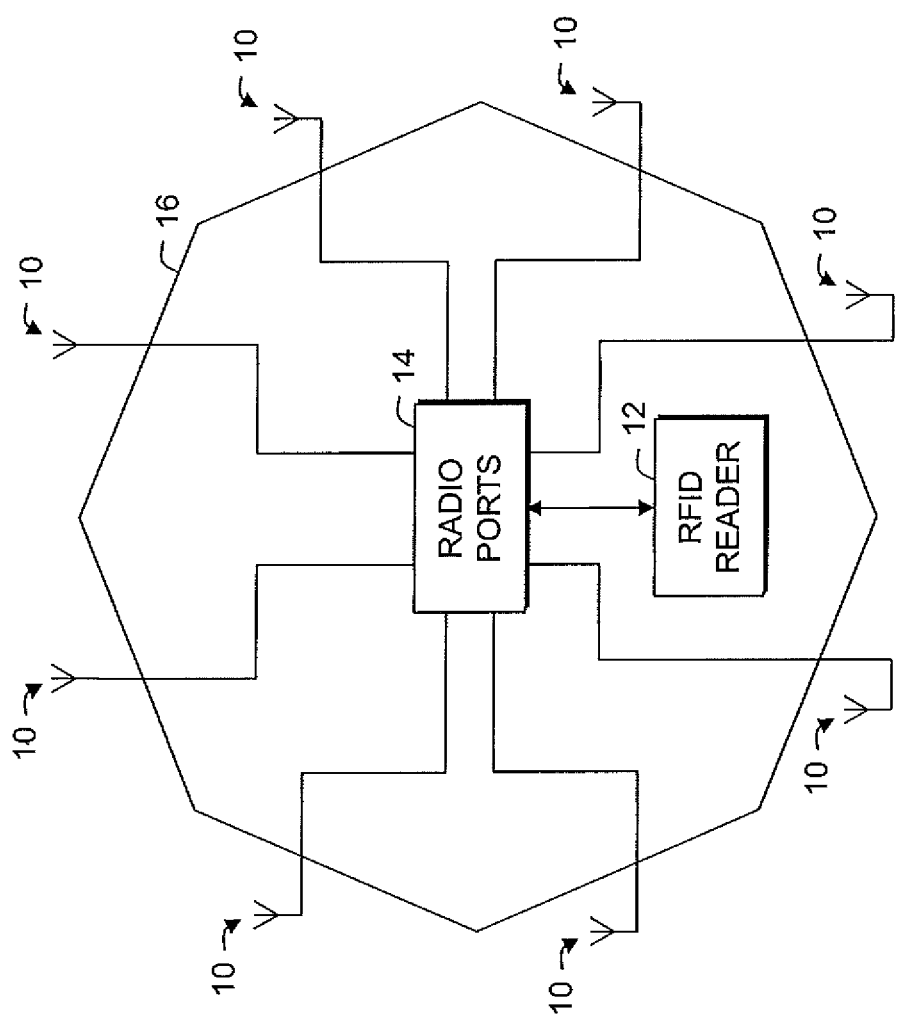
FIG. 1 is a simplified block diagram of an RFID reader and antenna arrangement, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, the present invention provides a Radio Frequency Identification (RFID) antenna apparatus and method that minimize the number of RFID reader systems (especially ceiling mounted) installed in a particular environment, while maintaining/increasing overall read accuracy and read percentages. The present invention also provides an overhead system in a small and lightweight arrangement.

Typically, RFID is a passive technology where a human operator can read tags affixed to objects presented to the operator using a hand-held reader. Alternatively, objects can be passed in proximity to a fixed RFID reader such that the object tags can be read. However, ceiling-mounted RFID readers that passively read RFID tags is a logical next step of this technology's evolution. Overhead RFID readers do not require human operation. However, the configuration of such readers requires an antenna with high gain, which can read tags at various locations and distances within the read environment. High gain (e.g., ~6 dB) is needed to maximize read range while keeping required power relatively low. Furthermore, greater antenna beamwidth is desired in order to optimize the RF coverage area. Reductions to practice have proven that in an overhead reader environment, when RF energy is launched into a wider area, the read performance (overall read accuracy and read percentages) is improved. As the antenna gain is increased however, the antenna beamwidth decreases while the required antenna size increases. Therefore, a proper balance must be achieved that optimizes the system for a high enough gain, a large enough beamwidth, a low enough power, and a small enough physical size. The example embodiment utilizes 6 dB gain antennas operated at 30 dBm transmit power, which meets the acceptable limits imposed by the FCC. Emitted isotropic radiated power (EIRP) is maximized at 36 dB (or 4 W) and the 3 dB (half power) beamwidth is maximized at 93 degrees. Increasing the gain beyond 6 dB would allow the system to be operated at a lower power, but the beamwidth would decrease, hurting RF performance, and the physical size would grow, becoming too impractical. Physical size of the reader needs to be kept to a minimum so that the system is unobtrusive, easy to install, integrate, and maintain, and can allow for other features, such as a security camera, access point electronics, etc.

FIG. 1 illustrates a block diagram of an antenna arrangement of one embodiment of the present invention. An RFID reader 12 can be connected to a plurality of antenna elements 10 via an antenna switch or different radio ports of the RFID reader. Also, the RFID reader can be integrated with an access point (not shown) and can direct the different radio ports to sequentially communicatively connect only one antenna element at a time to the RFID reader such that only one antenna element is operable to transmit/receive at any instant in time. The RFID reader can provide any tag information it obtains to an access point (not shown) that can be wired or wirelessly connected to a local area network (not shown) for inventory purposes, for example. Although eight antenna elements are shown, there could be any number of elements. Preferably, there is an even number of antenna elements arranged in a circle to radiate outwardly from the circle. As shown in this embodiment, there are eight antenna elements evenly disposed at 45 degree intervals of the circle and connected to an eight-port radio.

Figure 2:
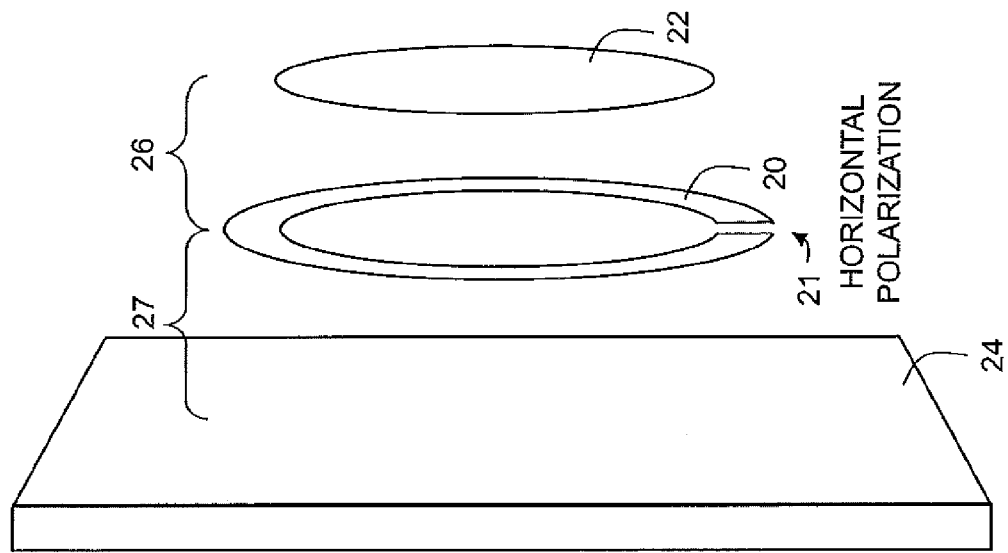
FIG. 2 is a perspective view of linearly polarized antenna elements, in accordance with some embodiments of the present invention.
Figure 2:
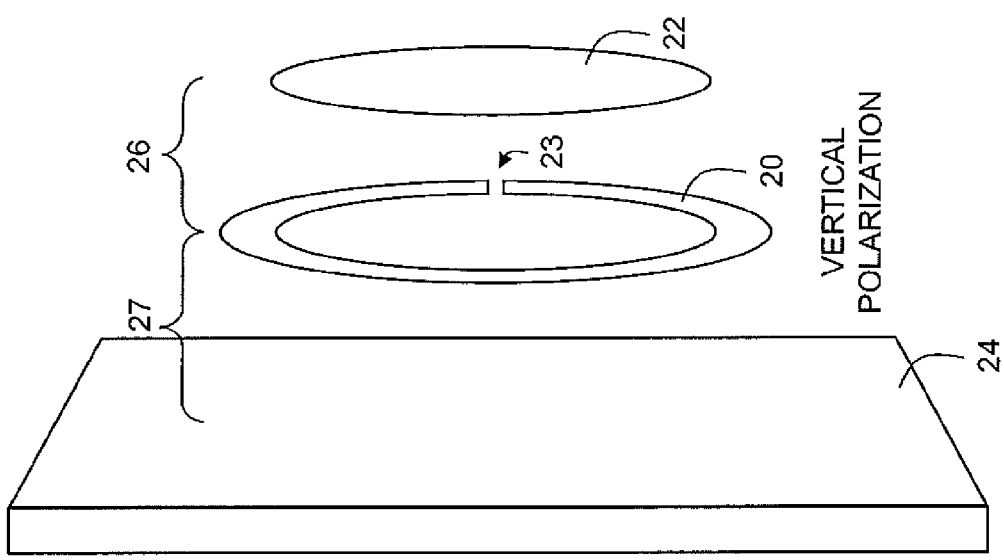

Referring to FIG. 2, in one embodiment, the antenna element 10 includes a linearly polarized, full wavelength loop as the driven element 20 that is oriented between, and parallel to, a conductive circular director plate 22 and a conductive reflector panel 24, wherein the loop element is fed by an RF signal at a specific point. It should be recognized that there can be embodiments without the director plate, reflector panel, or both. Those skilled in the art will recognize that in addition, the loop geometry can be different than what is shown in the exemplary embodiment—as examples, the size can be larger or smaller, the shape does not have to be a circle, the width of the loop does not need to be constant, etc. Variations of the director plate geometry are also acceptable, including but not limited to changes in shape, size, etc. Also, the director plate and/or the reflector panel may have holes cut out. Furthermore, the geometric details of the loop, director plate, and reflector do not necessarily have to be the same for both antenna polarizations. Ultimately, the physical shape, size, and configuration of the antenna geometry should be resonant at 915 MHz, which is a standard frequency for RFID applications. In accordance with the present invention, the antenna elements are linearly polarized to provide either of a first polarization and a second polarization that is ninety degrees to the first polarization. In particular, half of the antenna elements have the first polarization and half have the second polarization. The feed point of the first polarization could be anywhere along the loop element as long as the feed point of the second polarization is located ninety degrees from the feed point of the first polarization. In one embodiment, the feed point of the first polarization is at point 23 (or opposite point 23) which provides a vertical polarization. Then the feed point of the second polarization is at point 21 (or opposite point 21) which provides a horizontal polarization, i.e. ninety degrees from the first polarization. In accordance with the present invention, the first and second polarized antenna elements are positioned around a circle (as shown in FIG. 1) wherein the antenna elements alternate polarizations around the circle, e.g. a vertically polarized antenna element has two neighboring horizontally polarized antenna elements, and vice versa.

In the example shown in FIG. 2, the director plate 22 has a spacing 26 of about 1¼ inches from the loop element 20, and the loop element 20 has a spacing 27 of about 2 inches from the reflector panel 24, for a 915 MHz system, which is a standard frequency for RFID applications. It should be noted that spacing 26 and spacing 27 each do not necessarily have to be the same for both antenna polarizations. The reflector panel is approximately 7 inches square, while the loop antenna is approximately 4 inches in diameter, with the director plate being slightly less. It should be noted that these values are approximate, and they could all be varied to affect a different antenna gain or radiation pattern. It should also be noted that the reflector panel(s) are illustrated herein in a substantially square shape, but those of ordinary skill in the art will recognize other shapes are also contemplated. The use of a reflector panel placed behind the loop antenna and having a parallel spacing thereto helps to reflect back most of the RF energy, making the antenna element a high gain antenna system. The reflector panel takes energy that is directed backwards towards it from the loop element and redirects it, combining it with the directly radiated pattern that was already directed forward. The result is a high gain, directional antenna.

The configuration shown in FIG. 2 provides 6 dB antenna gain along its bore sight (perpendicular to the plane of the loop), which equates to 4 watts of radiated power from a 1 watt transmitter in the RFID reader. The loop element and director plate can be spaced from each other using insulating spacers or standoffs (not shown) as are known in the art. The loop element and reflector panel can be spaced from each other in a similar fashion. It should also be recognized that completely different antenna element configurations can be used successfully in the present invention, other than the embodiment shown, to provide a substantially linear polarization, including, but not limited to, a partial loop antenna, a Yagi antenna, a slot antenna, a dipole antenna, a monopole antenna, and the like. It should be recognized that a Yagi antenna, a slot antenna, a dipole antenna, a monopole antenna, and the like can be modified in size and shape while still electrically behaving as a respective Yagi antenna, slot antenna, dipole antenna, a monopole antenna, and the like tuned to the proper RFID frequency band.

The present invention utilizes a plurality of the linearly polarized antenna elements of FIG. 2, arranged in a circle (FIG. 1 showing eight elements arranged in a circle) and alternating the polarization of each antenna to achieve 360 degrees of coverage. The system turns each antenna on and off individually, switching from one antenna to the next, so only one antenna is transmitting/receiving at any instant in time. In one embodiment, there are eight antennas spaced at 45 degree intervals, with their linear polarizations alternating from horizontal to vertical to horizontal, etc. The antennas have a gain of 6 dB, which corresponds to a 3 dB (half power) beamwidth of about ±46.5 degrees. In other words, each antenna element provides an antenna gain that is down 3 dB from its 6 dB peak at about ±46.5 degrees from its bore sight, such that RFID read coverage areas of neighboring antenna elements do not significantly overlap. The actual radiation patterns can be affected by the configuration of the loop, director, and reflector plate for each element, and by the nature of mounting each antenna element together in a circle, as will be detailed below.

Figure 3:
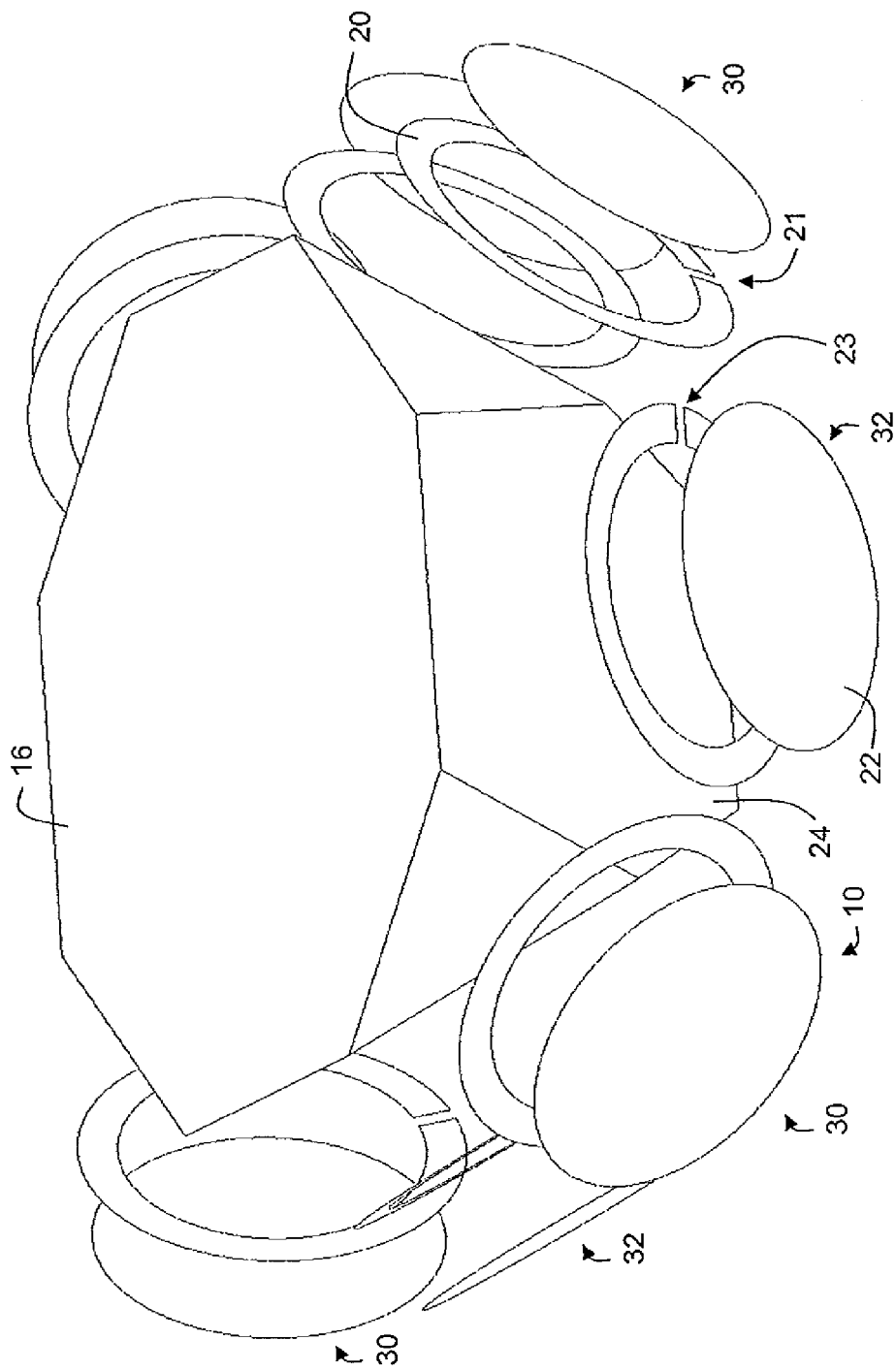
FIG. 3 is a perspective view of an embodiment of an actual antenna arrangement of FIG. 1.

FIG. 3 shows a perspective view of an eight element antenna arrangement of the present invention from FIG. 1. All the reflector panels 24 are joined together to create a central metal box or housing 16 that is a trapezoidal pyramidal section with planar surfaces, and that acts as a common reflector for all the antenna elements 10 as well as an electrical ground for the other system contents located inside the box. The central housing 16 can alternatively be a continuous conical surface, as opposed to the faceted embodiment shown in FIG. 3. The antenna arrangement includes alternating horizontally polarized antenna elements 30 (fed at a first point 21) and vertically polarized antenna elements 32 fed at a second point 23 that is rotated ninety degrees from the first point 21. The configuration shown results in an overall maximum dimension of about 19 inches wide and about 6 inches tall with the housing portion having a maximum dimension of about 12 inches wide.

The present invention provides certain advantages over the known art. In particular, for a fixed overhead RFID reader, it is not necessary to use circularly polarized antennas or linearly cross-polarized antennas to cover the full 360 degrees of the read zone. In fact, when properly arranged, a linearly polarized antenna solution can be provided where the antenna covering the first 45 degrees of the read zone can be horizontally polarized, and the adjacent 45 degree read zone can be covered by a vertically polarized antenna. Conventional thinking would lead one to believe that alternating linear polarizations does not provide adequate RF coverage, especially when the patterns of adjacent antennas do not significantly overlap. In other words, it might be assumed that a vertically polarized antenna element could not read a horizontally oriented tag in its read zone, and vice versa. However, multiple reductions to practice have proven that this is not the case; the performance of the alternating linear polarization system is indeed on par or better than its circularly polarized counterpart. Because of the natural reflections and multipath created by the overhead reading environment, horizontal antennas can read vertically oriented tags and vertical antennas can read horizontally oriented tags. This is because signals can change polarization when they are reflected. In effect, a reflection from a horizontal tag can have a vertical component, and vice versa. Therefore, tags will not be missed using simpler alternating linear antenna polarizations. In addition, the overhead RFID reader of the present invention has advantages over a handheld RFID reader in that the overhead reader environment provides more opportunity for reflections and multipath since tags are being read over larger distances. As a result, there are more walls, floor space, store merchandise, people, etc. to create multipath and reflection signals.

Figure 4:
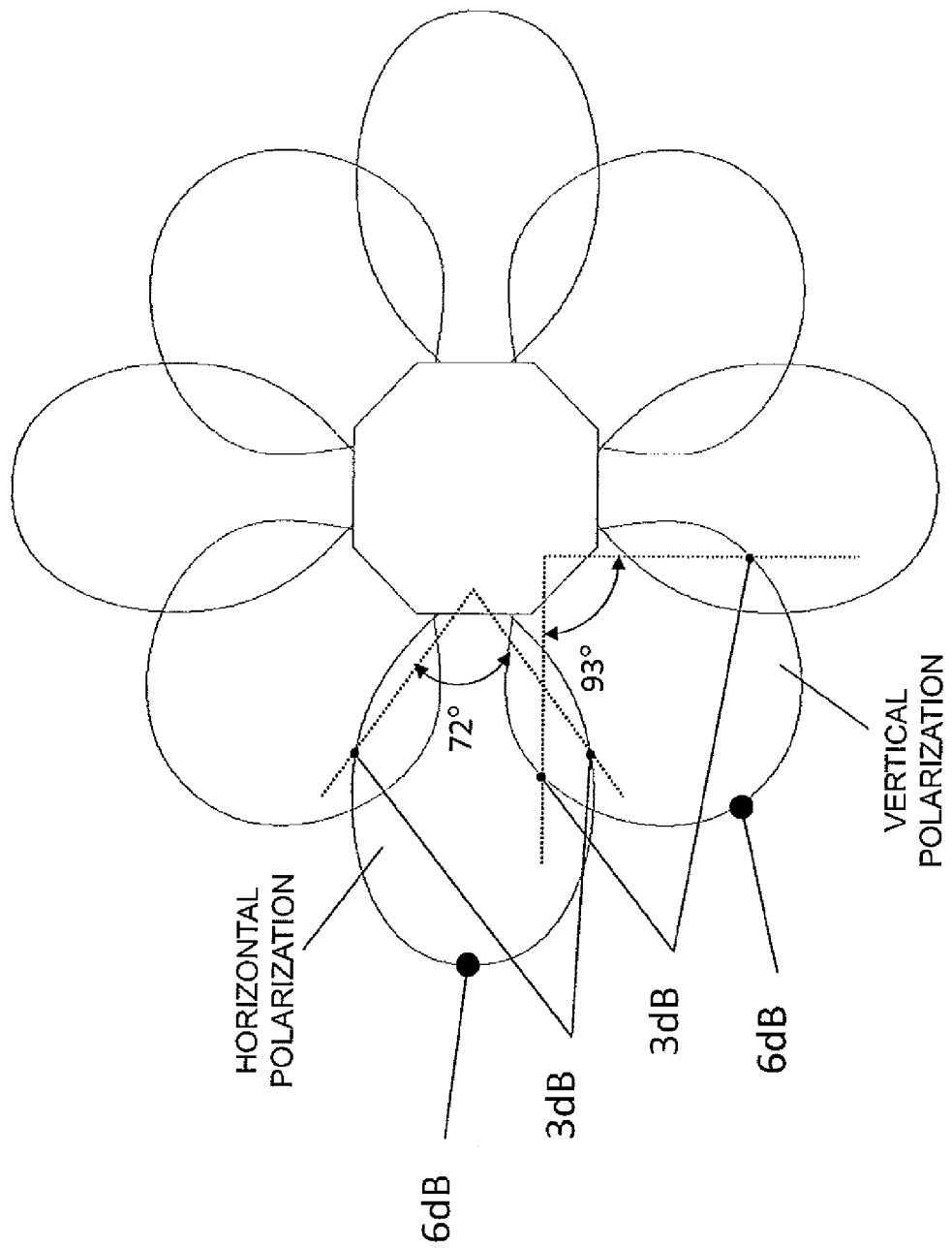
FIG. 4 is a cross-sectional top view of radiation patterns for vertically and horizontally polarized antenna elements in accordance with some embodiments of the present invention.

In practice, the vertically polarized and horizontally polarized antenna elements provide somewhat different ovoid radiation patterns due to the configuration of the loop, director plate, and reflector plate for each element, and by the nature of mounting each antenna element together in a circle. Furthermore, as the feed location is rotated to change from one polarization to the next, the resulting antenna pattern also rotates. FIG. 4 shows a top view of the radiation patterns of the alternating vertically and horizontally polarized antenna elements of FIG. 1. As can be seen, the patterns are not identical, with the vertically polarized antenna elements having a wider beamwidth in azimuth than the horizontally polarized antenna elements. In elevation (not shown, but perpendicular to the drawing sheet), the vertically polarized antenna elements have a narrower beamwidth than the horizontally polarized antenna elements. In particular, the horizontally polarized antenna element provides an azimuth 3 dB (half power) beamwidth of about 72 degrees and the vertically polarized antenna element provides an azimuth 3 dB (half power) beamwidth of about 93 degrees as shown. Whereas the horizontally polarized antenna element provides an elevation 3 dB (half power) beamwidth of about 93 degrees and the vertically polarized antenna element provides an elevation 3 dB (half power) beamwidth of about 72 degrees (not shown). To accommodate these radiation pattern differences, the present invention provides a specialized mounting angle for each antenna element.

Inasmuch as a vertically polarized antenna element provides a different radiation pattern than a horizontally polarized antenna element, the present invention seeks to provide a more uniform elevation beamwidth strength for all antenna elements. In other words, tags at a specific distance from the antenna arrangement and at a specific height from the floor should receive the same minimum signal strength from an antenna element no matter which (vertical or horizontal) read zone it is located in. Therefore, the present invention provides the vertically polarized antenna elements with a first angular tilt with respect to a ceiling and the horizontally polarized antenna elements with a second angular tilt with respect to the ceiling different from the first angular tilt, such that the radiation patterns from each antenna element are similar. To achieve this, the first angular tilt is greater than the second angular tilt such that the vertically polarized antenna elements are directed more downwardly from the ceiling than the horizontally polarized antenna elements. In the configuration shown in FIG. 3, the vertically polarized antenna elements are 30 degrees off vertical and the horizontally polarized antenna elements are 15 degrees off vertical. Numerous RF simulations were run and physical RF mockups of the system of FIG. 3 were built, and the testing validates the concepts associated with the antenna apparatus of the present invention. Antenna gain and radiation pattern were all confirmed, and this configuration provides the ability to read all tags in the environment.

The present invention also provides advantages over prior art antenna arrangements. For example, although multiple circularly polarized antennas could be used to provide a 360 degree read field, circularly polarized antennas need an additional 3 dB of circular gain to match the gain of their linear equivalent (e.g. 9 dB circular=6 dB linear). This need for higher gain would result in a significantly larger circularly polarized antenna over that of the linearly polarized antennas of the present invention, and when multiplying by the number of antennas in the overhead reader needed for 360 degrees of coverage (e.g. eight antenna elements spread out in 45 degree intervals), a resulting product using circularly polarized antennas would be significantly larger. Therefore, the solution of providing the physically smaller alternating linearly polarized antenna elements of the present invention results in a truly integrated solution that is simpler, smaller, and lighter than is available in the prior art.

Figure 5:
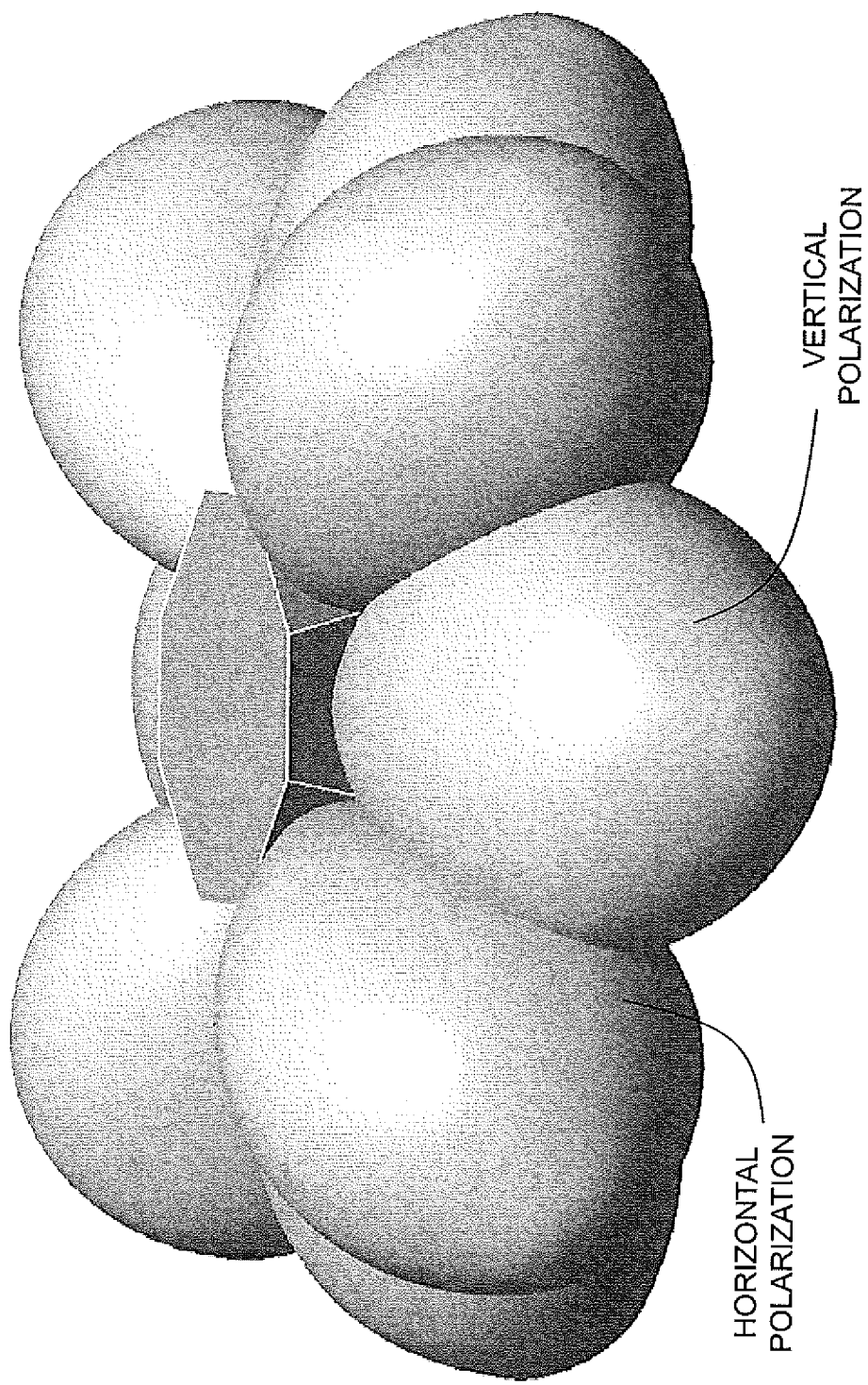
FIG. 5 is a perspective view of the three dimensional radiation pattern for the antenna arrangement of FIG. 3.

FIG. 5 is a perspective view of the composite radiation patterns of the antenna arrangement of FIG. 3. As previously described, the separate tilt of the vertically and horizontally polarized antenna elements results in radiation patterns that provide a more uniform elevation beamwidth strength for all antenna elements. In particular, the vertical elements have a weaker elevation beamwidth and are therefore aimed lower than the stronger horizontal elements.

Figure 6:
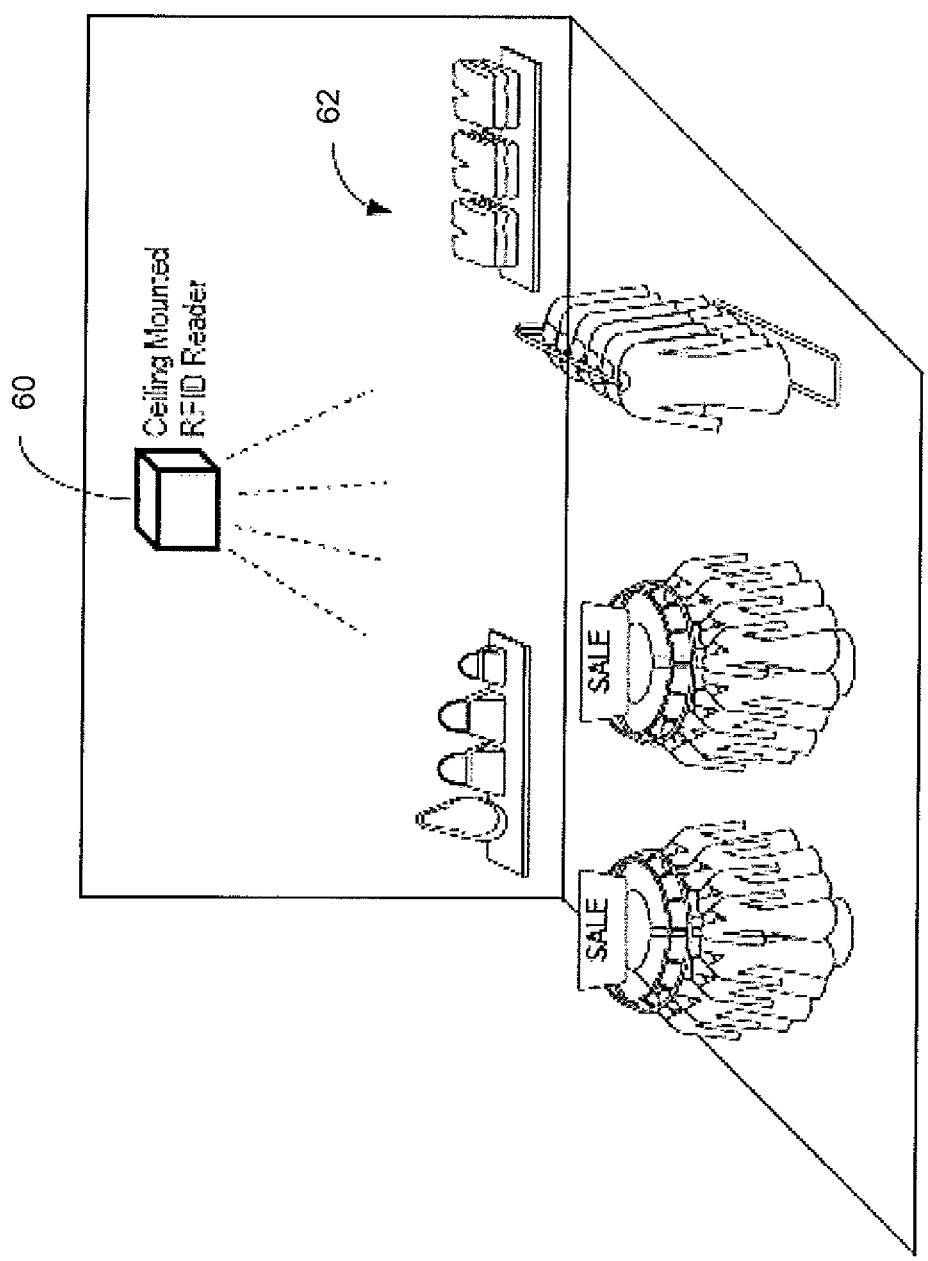
FIG. 6 is a perspective view of an example environment utilizing the antenna arrangement and RFID reader of FIG. 1.

FIG. 6 is a perspective diagram of an exemplary retail environment with an RFID reader 60 using the RFID antenna arrangement of the present invention in a ceiling-mounted overhead configuration. The RFID reader 60 is configured to wirelessly interrogate a plurality of RFID tags located on or affixed to a plurality of items 62. The RFID reader 60 may be mounted to a ceiling or other overhead fixture in the retail environment. The retail environment is shown solely for illustration purposes, and the RFID antenna may be used in any environment including warehouse, manufacturing facility, file room, storage area, and the like.

The RFID reader 60 of the present invention includes a housing enclosing the wireless radios of the RFID reader disposed therein and communicatively coupled to the antenna arrangement by providing an RF feed thereto via the radio ports. The housing can also include associated electronics for providing RFID reader functionality. The housing may further include a camera and an access point coupled to or integrated with the RFID reader. The RFID reader including the antenna apparatus is configured to operate in an overhead configuration with respect to a plurality of RFID tags. The multiple antenna elements are configured to provide a far field radiation pattern covering the floor of the environment.

In general, the RFID reader is configured to provide communication between the RFID reader and RFID tags. For example, the RFID reader "interrogates" RFID tags, and receives signals back from the tags in response to the interrogation. The reader is sometimes termed as "reader interrogator" or simply "interrogator". In an exemplary embodiment, the RFID reader may include, without limitation one or more of: a processor, a communication module, memory, a camera, and the antenna arrangement (10 of FIG. 1). The elements of the RFID reader may be interconnected together using a communication bus or another suitable interconnection arrangement that facilitates communication between the various elements of RFID reader. It should be appreciated that the above description depicts the RFID reader in an oversimplified manner and a practical embodiment can include additional components and suitably configured processing logic to support known or conventional operating features that are not described in detail herein for the sake of brevity.

The RFID reader is controlled by one or more processors to interrogate the RFID tags of the items. The housing can further include electronics and RF components for operation of the antenna arrangement. For example, the electronics and components may include electrical connectivity to the antenna feeds for transmission and reception of radio frequency signals. The housing may further include electronics and the like for operation of the RFID reader as well as other components as described herein. The housing is defined by the joined reflector panels of all the antenna elements. The electronics, components, etc. may be disposed or located behind the reflector panels within the housing.

The processor may be any microprocessor, application specific integrated circuit (ASIC), field programmable gate array (FPGA), digital signal processor (DSP), any suitable programmable logic device, discrete gate or transistor logic, discrete hardware components, or combinations thereof that has the computing power capable of managing the RFID reader 10. The processor generally provides the software, firmware, processing logic, and/or other components of the RFID reader 10 that enable functionality of the RFID reader.

The RFID reader can also include a communication module including components enabling the RFID reader to communicate on a wired or wireless network. For example, the communication module may include an Ethernet interface to communicate on a local area network. The communication module can be compliant to IEEE 802.11 and variants thereof). Additionally, the RFID reader may include other wireless technologies such as, but are not limited to: RF; IrDA (infrared); Bluetooth; ZigBee (and other variants of the IEEE 802.15 protocol); IEEE 802.11 (any variation); IEEE 802.16 (WiMAX or any other variation); Universal Mobile Telecommunications System (UMTS); Code Division Multiple Access (CDMA) including all variants; Global System for Mobile Communications (GSM) and all variants; Time division multiple access (TDMA) and all variants; Direct Sequence Spread Spectrum; Frequency Hopping Spread Spectrum; wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

The RFID reader can also include a memory including any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory can incorporate electronic, magnetic, optical, and/or other types of storage media. Note that the memory can have a distributed architecture, where various components are situated remotely from one another, but can be accessed by the processor. The memory may be utilized to store data associated with RFID interrogations, the camera, etc. The camera may include any device for capturing video, audio, photographs, etc.

Figure 7:
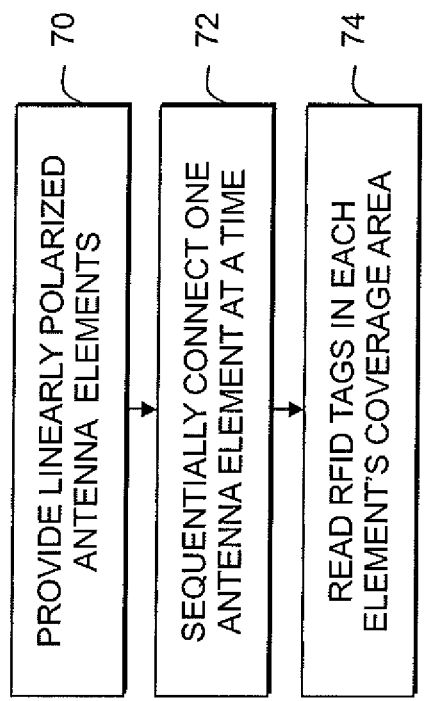
FIG. 7 shows a flowchart of a method in accordance with some embodiments of the present invention.

Referring to FIG. 7, the present invention describes a method for reading Radio Frequency Identification (RFID) tags with a fixed overhead RFID reader. A first step 70 includes providing a plurality of linearly polarized antenna elements. In one embodiment, each antenna element comprises a linearly polarized, full wavelength loop element oriented between, and parallel to, a director plate and a reflector panel. In another embodiment, there is an even number of antenna elements arranged in a circle to radiate outwardly from the circle. In another embodiment, there are eight antenna elements evenly disposed at 45 degree intervals of the circle, each with a gain of 6 dB. Preferably, the antenna elements are linearly polarized to provide either of a first (e.g. vertical) polarization and a second (e.g. horizontal) polarization ninety degrees to the first polarization, and wherein the antenna elements alternate polarizations around the circle. In this configuration, each antenna element provides an antenna gain that is down 3 dB (half power) at about ±46.5 degrees from its bore sight, such that RFID read coverage areas of neighboring antenna elements do not significantly overlap. It can be that the reflector panels of the antenna elements are joined together to define a common reflector box, wherein the reflector box defines a housing that contains the radio and RFID reader and acts as an electrical ground for electrical components in the box. In another embodiment, the antenna elements with the first (e.g. vertical) polarization have a first angular tilt with respect to a ceiling and the antenna elements with the second (e.g. horizontal) polarization have a second angular tilt with respect to the ceiling different from the first angular tilt, where the first angular tilt is greater than the second angular tilt such that vertically polarized antenna elements are directed more downwardly from the ceiling than horizontally polarized antenna elements.

A next step 72 includes sequentially communicatively connecting only one antenna element at a time to the RFID reader via radio ports such that only one antenna element is operable to transmit/receive at any instant in time. This can be done under the direction of an RFID reader or other processor.

A next step 74 includes reading RFID tags within an RFID read coverage area of each sequenced antenna element.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An antenna apparatus for a Radio Frequency Identification (RFID) reader, comprising:
   a fixed overhead housing configured to enclose an RFID reader having a plurality of radio ports coupled thereto; and
   a plurality of antenna elements disposed outside of the housing and configured to be coupled to the radio ports through the housing, each antenna element comprising a full wavelength loop element oriented between, and parallel to, a director plate and a reflector panel, the reflector panels of the antenna elements being joined together to define a common reflector box defining the housing that contains the radio ports and acts as an electrical ground for electrical components in the common reflector box;
   wherein the antenna elements are linearly polarized and are each arranged in a circle around the housing, with a first type of the antenna elements outwardly radiating vertical polarization and with a second type of the antenna elements outwardly radiating horizontal polarization, and wherein the first type of the antenna elements and the second type of the antenna elements are alternately arranged in the circle, and
   wherein the RFID reader directs the radio ports to sequentially communicatively connect only one antenna element at a time to the RFID reader such that only one antenna element is operable to transmit/receive at any instant in time.

2. The antenna apparatus of claim 1, wherein there are eight antenna elements evenly disposed at 45 degree intervals of the circle, each with a gain of 6 dB, wherein each antenna element provides an antenna gain that is down 3 dB (half power) at about ±46.5 degrees from its bore sight, such that RFID read coverage areas of neighboring antenna elements do not significantly overlap.

3. The antenna apparatus of claim 1, wherein each antenna element covers its own different read coverage area that do not significantly overlap.

4. The antenna apparatus of claim 1, wherein the vertically polarized antenna elements have a first angular tilt with respect to a ceiling that is directed more downwardly from the ceiling than the horizontally polarized antenna elements that have a second angular tilt with respect to the ceiling that is directed less downwardly than the first angular tilt in order to provide a uniform elevation beamwidth strength for all antenna elements.

5. A Radio Frequency Identification (RFID) reader, comprising:
   a fixed overhead housing containing the RFID reader;
   a plurality of radio ports disposed within the housing; and
   an antenna apparatus disposed outside of the housing and coupled to provide communications to the RFID reader via the radio ports, wherein the antenna apparatus comprises:
     a plurality of linearly polarized antenna elements coupled to the radio ports, each antenna element comprising a full wavelength loop element oriented between, and parallel to, a director plate and a reflector panel, the reflector panels of the antenna elements being joined together to define a common reflector box defining the housing that contains the radio ports and acts as an electrical ground for electrical components in the common reflector box;
   wherein the antenna elements are each arranged in a circle around the housing, with a first type of the antenna elements outwardly radiating vertical polarization and with a second type of the antenna elements outwardly radiating horizontal polarization, and wherein the first type of the antenna elements and the second type of the antenna elements are alternately arranged in the circle, and
   wherein the RFID reader directs the radio ports to sequentially communicatively connect only one antenna element at a time to the RFID reader such that only one antenna element is operable to transmit/receive at any instant in time.

6. The RFID reader of claim 5, where each antenna element covers its own different read coverage area that do not significantly overlap.

7. The RFID reader of claim 5, wherein the vertically polarized antenna elements have a first angular tilt with respect to a ceiling that is directed more downwardly from the ceiling than the horizontally polarized antenna elements that have a second angular tilt with respect to the ceiling that is directed less downwardly than the first angular tilt in order to provide a uniform elevation beamwidth strength for all antenna elements.

8. The RFID reader of claim 5, wherein there are eight antenna elements evenly disposed at 45 degree intervals of the circle, each with a gain of 6 dB, wherein each antenna element provides an antenna gain that is down 3 dB (half power) at about ±46.5 degrees from its bore sight, such that RFID read coverage areas of neighboring antenna elements do not significantly overlap.

9. A method for reading Radio Frequency Identification (RFID) tags with a fixed overhead RFID reader having a plurality of radio ports coupled thereto, the method comprising the steps of:
   providing a plurality of antenna elements each comprising a full wavelength loop element oriented between, and parallel to, a director plate and a reflector panel, the reflector panels of the antenna elements being joined together to define a common reflector box defining a housing that contains the radio ports and acts as an electrical ground for electrical components in the common reflector box, wherein the antenna elements are linearly polarized and are each arranged in a circle around the housing, with a first type of the antenna elements outwardly radiating vertical polarization and with a second type of the antenna elements outwardly radiating horizontal polarization, and wherein the first type of the antenna elements and the second type of the antenna elements are alternately arranged in the circle;
   sequentially communicatively connecting only one antenna element at a time to the RFID reader via the radio ports such that only one antenna element is operable to transmit/receive at any instant in time; and
   reading RFID tags within an RFID read coverage area of each sequenced antenna element.

10. The method of claim 9, where each antenna element covers its own different read coverage area that do not significantly overlap.

11. The method of claim 9, wherein the vertically polarized antenna elements have a first angular tilt with respect to a ceiling that is directed more downwardly from the ceiling than the horizontally polarized antenna elements that have a second angular tilt with respect to the ceiling that is directed less downwardly than the first angular tilt in order to provide a uniform elevation beamwidth strength for all antenna elements.

12. The method of claim 9, wherein there are eight antenna elements evenly disposed at 45 degree intervals of the circle, each with a gain of 6 dB, wherein each antenna element provides an antenna gain that is down 3 dB (half power) at about ±46.5 degrees from its bore sight, such that RFID read coverage areas of neighboring antenna elements do not significantly overlap.

* * * * *